United States Patent [19]

Okamoto et al.

[11] Patent Number: 4,795,621
[45] Date of Patent: Jan. 3, 1989

[54] PROCESS FOR THE PREPARATION OF PHOSPHONITRILE CHLORIDE OLIGOMER

[75] Inventors: Tetsuhiko Okamoto; Shinichiro Ueyama; Kazuhiko Fujikawa, all of Tokyo, Japan

[73] Assignee: Shin Nisso Kako Co., Ltd., Japan

[21] Appl. No.: 896,338

[22] Filed: Aug. 13, 1986

[30] Foreign Application Priority Data

Aug. 14, 1985 [JP] Japan .................. 60-177478

[51] Int. Cl.$^4$ .................................... C01B 25/10
[52] U.S. Cl. ..................................... 423/300
[58] Field of Search ......................... 423/300

[56] References Cited

U.S. PATENT DOCUMENTS

2,788,286  4/1957  Teja et al. .................. 423/302
4,567,028  1/1986  Tanino et al. ............... 423/300

FOREIGN PATENT DOCUMENTS

57-3705   1/1982  Japan .
57-77012  5/1982  Japan .
58-19604  4/1983  Japan .

OTHER PUBLICATIONS

Sulkowski et al., "Synthesis of High Purity Hexachlorocyclotriphosphazene and Octachlorocyclotetraphosphazene", Chem. Stos, 26 (2), 245-252 (198 2).
"Gaisetsu Muki Kobunshi" (Outline for Inorganic Polymer), pp. 69-71, Dr. Meisetsu Kajiwara, published by Chijin Shokan Apr. 10, 1978.

*Primary Examiner*—John Doll
*Assistant Examiner*—Wayne A. Langel
*Attorney, Agent, or Firm*—Lowe, Price, Leblanc, Becker & Shur

[57] ABSTRACT

Phosphonitrile chloride oligomer, particularly, phosphonitrile chloride trimer, is produced in high yield while suppressing the formation of by-product phosphonitrile chloride tetramer, by reacting phosphorus pentachloride with ammonium chloride in an inert organic solvent, in the presence of a catalytic amount of a compound selected from the group consisting of quinoline, isoquinoline and their drivatives represented by the general formulae:

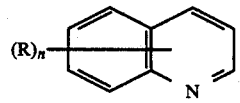

and

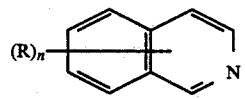

wherein R stands for an alkyl group or a halogen atom and n stands for zero or an integer of 1 to 7, and pyridine derivatives represented by the general formula:

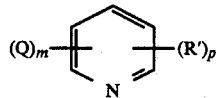

wherein Q stands for a halogen atom or a hydroxyl group; R' stands for an alkyl group; m stands for an integer of 1 to 5 and p stands for zero of an integer of 1 to 4 with the proviso that the total number of m and p is from 1 to 5, and in the presence of a catalytic amount of a polyvalent metal compound.

12 Claims, No Drawings

PROCESS FOR THE PREPARATION OF PHOSPHONITRILE CHLORIDE OLIGOMER

BACKGROUND OF THE INVENTION

1. Field of the Invention

The present invention relates to a process for the preparation of a phosphonitrile chloride oligomer mixture having a high content of cyclic phosphonitrile chloride trimer which has a wide range of use and is in greatest demand, for example, as a raw material for the preparation of oligomer or polymer obtained by replacing the chlorine atom of phosphonitrile chloride oligomer or polymer thereof with another group which is excellent in heat resistance, cold resistance, inflammability, electric insulation and the like.

2. Description of the Prior Art

Phosponitrile chloride oligcmer can generally be represented by the formula.

$(NPCl_2)_l$  (I)

wherein l represents an integer of 3 or greater, and has attracted attention as an industrial material since many of the derivatives and polymers thereof have excellent properties in heat resistance, cold resistance, inflammability, electric insulation and the like. Among the above oligomers, a cyclic phosphonitrile chloride trimer of the above-mentioned formula (I) in which l=3 (hereinafter abbreviated as "3PNC") has a particularly wide range of use and thus is in greatest demand. Accordingly, it has been desired to produce 3PNC with a high yield and a high purity. However, a reaction process for preparing 3PNC alone is not yet known and 3PNC has always been obtained in the form of a mixture with various kinds of oligomers in the conventional production process for phosphonitrile chloride oligomer. Accordingly, it has been attempted so far for the production of 3PNC to improve the reaction yield in the entire mixture of phosphonitrile chloride oligomers as well as increase the ratio of 3PNC formed therein. Several examples of such processes of the prior art are given below. (1) A process for reacting phosphorus pentachloride and ammonium chloride under the presence of a quinoline as the catalyst in a solvent of tetrachloroethane is disclosed in U.S. Pat. No. 2,788,286. Although it has been described therein that 3PNC and the heptamer can be obtained with no substantial formation of the tetramer (hereinafter abbreviated occasionally as "4PNC"), the reaction yield of 3PNC is low in the cited process. (2) Japanese Patent Laid-Open Nos. 3705/1982 and 77012/1982 disclose a process of reacting phosphorus pentachloride and ammonium chloride under the presence of a polyvalent metal compound catalyst, washing a solution of the reaction product in an aliphatic hydrocarbon or an ether with water and recovering a product containing cyclic phosphonitrile chloride oligomers at a high content. Although the yield for 3PNC in this process is relatively high, the process has disadvantages in that the content of 4PNC in the reaction product is high before washing with water and that it takes a long period of time for the reaction. (3) Japanese Patent Publication No. 19604/1983 proposes a process for reacting phosphorus trichloride with chlorine to form phosphorus pentachloride, and reacting the thus formed phosphorus pentachloride with ammonium chloride under the presence of a polyvalent metal compound to produce a phosphonitrile chloride oligomer mixture. However, this publication mentions nothing concerning the individual formation rates for 3PNC and 4PNC. (4) A process for the preparation of phosphonitrile oligomer previously proposed by the inventors of the present invention (U.S. Pat. No. 4,567,028, Japanese Patent Application No. 32525/1984) which comprises reacting phosphorus pentachloride with ammonium chloride in the presence of a catalytic amount of pyridine or its alkyl-substituted derivative and a catalytic amount of a polyvalent metal compound. According to this process, a phosphonitrile chloride oligomer mixture having a high content for 3PNC and a low content for 4PNC which is relatively difficult to isolate from 3PNC and causes trouble in preparing a pure 3PNC can be prepared. For example, a phosphonitrile chloride oligomer mixture comprising at least 65% of 3PNC and less than 10% of 4PNC can be easily prepared.

SUMMARY OF THE INVENTION

It is an object of the present invention to provide a process for preparing a phosphonitrile chloride oligomer mixture with a high content of 3PNC having the greatest demand, with a low content of 4PNC, which is difficult to isolate from 3PNC and thus causes trouble in producing a pure 3PNC product.

The present invention relates to a process for the preparation of a phosphonitrile chloride oligomer mixture having a high 3PNC content and a low 4PNC content which involves reacting phosphorus pentachloride with ammonium chloride in the presence of a catalytic amount of a nitrogen-containing heterocyclic compound selected from the group consisting of quinoline, isoquinoline and their derivatives represented by the general formulae:

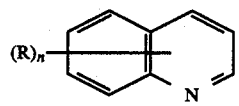

and

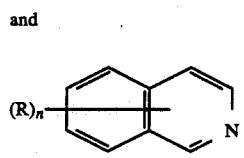

wherein R stands for an alkyl group or a halogen atom and n stands for zero or an integer of 1 to 7, and pyridine derivatives represented by the general formula:

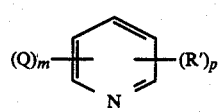

wherein Q stands for a halogen atom or a hydroxyl group; R' stands for an alkyl group; m stands for an integer of 1 to 5 and P stands for zero or an integer of 1 to 4 with the proviso that the tota number of m and p is from 1 to 5, and a catalytic amount of a polyvalent metal compound.

According to the process of the present invention, a phosphonitrile chloride oligomer mixture having a high 3PNC content and a low 4 PNC content can be obtained in a high overall yield similarly to the process of the above-mentioned U.S. Pat. No. 4,567,028.

DETAILED DESCRIPTION OF THE INVENTION

The process of the present invention is substantially the same as the one described in the above-mentioned U.S. Pat. No. 4,567,028 except that quinoline, isoquinoline, derivatives thereof, or a pyridine derivative is used instead of pyridine or certain alkyl derivatives thereof.

Therefore, the reaction conditions of the process according to the present invention are also nearly the same as those according to the U.S. Pat. No. 4,567,028.

Accordingly, the inert organic solvent and the polyvalent metal compound to be used in the present invention may be each the same as those used in preparing phosphonitrile chloride oligomer by the reaction of phosphorus pentachloride with ammonium chloride according to the prior art.

Inert Organic Solvent

The inert organic solvent usable in the process according to the present invention is any of the inert organic solvents conventionally known for preparing phosphonitrile chloride oligomer from phosphorus pentachloride and ammonium chloride. They include, for example, tetrachloroethane, tetrachloroethylene, monochlorobenzene, dichlorobenzene and nitrobenzene, among which tetrachloroethane and monochlorobenzene are preferable.

The solvent is used in an amount sufficient to enable the reaction system to be stirred uniformly and from 2 to 5 ml of the solvent per gram of phosphorus pentachloride is advantageously used. If the amount of the solvent used is insufficient, it will cause a difficulty in stirring, while on the other hand an excess amount of the solvent may retard the reaction rate as well as result in an economic disadvantage.

Polyvalent Metal Compound

The polyvalent metal compound usable in the process according to the present invention is any of those polyvalent metal compounds employed in the known processes for preparing a phosphonitrile chloride oligomer mixture from phosphorus pentachloride and ammonium chloride. As such polyvalent metal compounds, compounds of metals capable of acting as Lewis acid are effective. Examples of such metals are zinc, magnesium, tin, titanium, boron, aluminum, iron, cobalt, nickel, manganese, chromium and molybdenum. As the forms of the compounds, oxides, hydroxides, carbonates and organic acid salts that can be converted into chlorides with hydrogen chloride, chlorides, sulfates and nitrates can be mentioned.

In addition to the compounds mentioned above, copper salt may also be used.

It is not always essential to previously add the above-mentioned metal compound as such to the reaction system but, depending on the case, the element of the metal may be used while being converted into its chloride in the reaction system.

The polyvalent metal compound is used in a ratio preferably, of more than 1/200 mol and, of more preferably, more than 1/100 mol, per one mol of phosphorus pentachloride. If the amount of the poyvalent metal compound is lower than the above-specified range, no significant effect can be obtained and, on the other hand, an excessive amount, namely more than ½ mol of metal compound per one mol of phosphorus pentachloride, will increase the rate of linear polymers.

Quinoline, Isoquinoline or Derivatives thereof and Pyridine Derivatives

The quinoline, isoquinoline or derivatives thereof to be used in the present invention is represented by the above general formula wherein R is an alkyl group or a halogen atom. Particularly, compounds represented by the general formula wherein R is a lower alkyl group or a chlorine atom are preferred, while derivatives having both an alkyl group and a halogen atom can be also used. In the case wherein Q in general formula IV represents halogen atom, the preferred halogen is chlorine.

Examples of derivatives of quinoline or isoquinoline to be used in the present invention include 2-methylquinoline, 3-methylquinoline, 4-methylquinoline, 5-methylquinoline, 6-methylquinoline, 7-methylquinoline, 8-methylquinoline, 2-chloroquinoline, 3-chloroquinoline, 4-chloroquinoline, 5-chloroquinoline, 6-chloroquinoline, 2,3-dichloroquinoline, 2-methyl-4-bromoquinoline, 3-chloroisoquinoline and 8-chloroisoquinoline, while those of the pyridine derivatives include 2-hydroxypyridine, 3-hydroxypyridine, 4-hydroxypyridine, 2,6-dihydroxypyridine, 3-hydroxy-6-methylpyridine, 2-chloropyridine, 3-chloropyridine and 2,6-dichloropyridine, though they are not limited to the above examples.

Details for the action of quinoline, isoquinoline, their derivatives and pyridine derivatives have not yet been analyzed at present. However, since the amount of quinoline, isoquinoline, their derivatives or pyridine derivatives used in the present invention is extremely small, it is apparent that the action is different from that of an acceptor or catcher for hydrogen chloride generated as a by-product in the reaction of phosphorus pentachloride and ammonium chloride as described, for example, in "Gaisetsu Muki Kobunshi" (Outline for Inorganic Polymer) (p 69–71, written by Dr. Meisetsu Kajiwara, published by Chijin Shokan, on Apr. 10, 1978).

Quinoline, isoquinoline, their derivatives or pyridine derivatives may be used alone or in the form of a mixture of at least two of them in this invention.

Ratio of Reactants

In the present invention, it is preferred to use ammonium chloride in excess of an equimolar amount relative to phosphorus pentachloride and, usually, 1.1–1.5 mol of ammonium chloride are used per one mol of phosphorus pentachloride. If the amount of ammonium chloride is lower than the above-specified range, phosphorus pentachloride may remain partially unreacted, while on the other hand no further substantial effects can be obtained if the amount is in excess of the above specified range.

The amount of quinoline, isoquinoline, their derivatives or pyridine derivatives used herein is preferably, between 1/20 mol and one mol, and preferably, between 1/15 and ½ mol per one mol of phosphorus pentachloride If the amount of quinoline and the like is insufficient, no substantial effect can be obtained. On the other hand, if it is used excessively, the reaction temperature does not reach the desired temperature to reduce the yield of cyclic oligomers of phosphonitrile chloride and thus lowers the yield of 3PNC.

By the addition of such a small amount of quinoline or the like, the yield of 3PNC can be remarkably enhanced and the reaction time can be remarkably shortened. Accordingly, it can be presumed that quinoline, isoquinoline, derivatives thereof or pyridine derivatives can act catalytically on the reaction system together with the polyvalent metal compound.

Embodiment of the Invention

According to the present invention, the reaction is carried out, for example, as set forth below. An inert organic solvent, ammonium chloride, the above-mentioned polyvalent metal compound and quinoline, isoquinoline, a derivative thereof or a pyridine derivative are charged in a reaction vessel, to which a solution of phosphorus pentachloride in an inert organic solvent is added dropwise under stirring and heating. Alternatively, instead of the solution of phosphorus pentachloride, a solution of phosphorus trichloride in an inert organic solvent may be added dropwise and gaseous chlorine may be introduced through a separate route at a rate corresponding to the dropping rate of the phosphorus trichloride solution.

The reaction temperature, although not particularly restricted, ranges usually from about 100° to 200° C. and, preferably, from about 120° to 145° C. If the reaction temperature is lower than the above-specified range, the reaction scarcely proceeds. It is convenient to use an inert organic solvent having a boiling point within the above-defined temperature range and to allow the reaction to proceed under the reflux of the solvent.

The reaction terminates at a point when the evolution of hydrogen chloride gas ceases. The reaction mixture is preferably aged further for about 2 hours at the same temperature. Then, the reaction mixture is cooled to room temperature and, after filtering out the excess ammonium chloride, the inert organic solvent is distilled off under reduced pressure whereby a phosphonitrile chloride oligomer mixture can be obtained generally at a high yield of more than 90% based on the amount of phosphorus pentachloride employed. The mixture contains more than 65% and, in most cases, more than 70% of 3PNC, while the rate of 4PNC in the mixture is at most not in excess of 10% and, usually, between 4–5%.

The present invention is more specifically described below by way of examples.

EXAMPLE 1

300 g of monochlorobenzene, 38.6 g (0.72 mol) of ammonium chloride, 0.81 g ($9.9 \times 10^{-3}$ mol) of zinc oxide and 9.8 g ($7.59 \times 10^{-2}$ mol) of quinoline were placed in a 1−1 four-necked flask fitted with a stirrer, a reflux condenser, a dropping funnel and a thermometer. A solution of 125.0 g (0.6 mol) of phosphorus pentachloride in 300 g of monochlorobenzene which had been heated to 80° C. to 100° C. was dropwise added over a period of 5 hours to the flask at a temperature of 125° to 133° C., while heating the solvent under reflux and stirring. The obtained content was stirred under reflux for an additional 2 hours and cooled. The unreacted ammonium chloride was filtered out and the filtrate was distilled under a reduced pressure to distill off monochlorobenzene and quinoline, thus obtaining 69.2 g of a phosphonitrile chloride oligomer mixture as a distillation residue in a yield of 99.5%. The yield here and hereinafter refers to the one based on the phosphorus pentachloride used assuming that all of the phosphonitrile chloride formed is $(NPCl_2)_l$. The analysis of this mixture by gas liquid chromatography (GLC) showed that it was a phosphonitrile chloride oligomer mixture containing 70.5% of 3PNC and 1.7% of 4PNC.

EXAMPLE 2

The same procedure as the one described in Example 1 was repeated except that 0.94 g ($9.9 \times 10^{-3}$ mol) of anhydrous magnesium chloride and 9.8 g ($7.59 \times 10^{-2}$ mol) of isoquinoline were used instead of 0.81 g of zinc oxide and 9.8 g of quinoline, respectively, to obtain 59.0 g (yield: 84.8%) of a phosphonitrile chloride oligomer mixture containing 86.7% of 3PNC and 3.0% of 4PNC.

COMPARATIVE EXAMPLES 1

The same procedure as the one described in Example 1 was repeated except that no quinoline was used to obtain 66.4 g of a phosphonitrile chloride oligomer mixture (yield: 95.4%). The GLC analysis of this mixture showed that it was a phosphonitrile chloride oligomer mixture containing 44.5% of 3PNC and 16.9% of 4PNC.

EXAMPLES 3 TO 4

The same procedure as the one described in Example 1 was repeated except that 10.9 g of 3-methylquinoline and 12.4 g of 8-chloroquinoline, both corresponding to $7.59 \times 10^{-2}$ mol, were each used instead of 9.8 g of quinoline. The results are shown in Table 1.

TABLE 1

| Ex. No. | Catalyst | Yield | Reaction Product 3PNC content (%) | 4PNC content (%) |
|---|---|---|---|---|
| 3 | 3-methylquinoline | 98.1 | 77.7 | 4.6 |
| 4 | 8-chloroquinoline | 96.2 | 76.7 | 7.6 |

EXAMPLE 5

The same procedure as the one described in Example 1 was repeated except that 8.6 g ($7.59 \times 10^{-2}$ mol) of 3-chloropyridine was used instead of quinoline and that the amount of zinc oxide used was reduced to 0.41 g ($4.95 \times 10^{-3}$ mol) 68.3 g of a product was obtained (yield: 98.1%). This product was a phosphonitrile chloride oligomer mixture containing 70.3% of 3PNC and 8.9% of 4PNC.

EXAMPLE 6

The reaction was carried out in the same manner as in Example 1 except that 7.2 g ($7.59 \times 10^{-2}$ mol) of 4-hydroxypyridine was used instead of quinoline and that the amount of zinc oxide was 0.41 g ($4.95 \times 10^{-3}$ mol). The reaction mixture was cooled and filtered to remove unreacted ammonium chloride. The filtrate was distilled under reduced pressure to remove monochlorobenzene to obtain 65.3 g of a phosphonitrile chloride oligomer mixture as a distillation residue (yield: 95.2%). This mixture contained 67.3% of 3PNC and 5.7% of 4PNC.

What is claimed is:

1. A process for the preparation of phosphonitrile chloride oligomer in which the yield of cyclic phosphonitrile chloride trimer is increased and the yield of cyclic phosphonitrile chloride tetramer is decreased, comprising reacting phosphorus pentachloride with ammonium chloride in an inert organic solvent, and in the presence in the reaction system of a catalytic amount of a basic organic compound selected from the group consisting of quinoline, isoquinoline and their derivatives represented by the formulae:

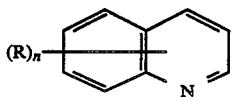

and

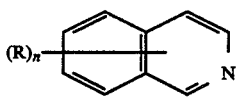

wherein R stands for an alkyl group or a halogen atom and n stands for zero or an integer of 1 to 7, and pyridine derivatives represented by the general formula:

wherein Q stands for a halogen atom or a hydroxyl group; R' stands for an alkyl group; m stands for an integer of 1 to 5 and p stands for zero or an integer of 1 to 4 with the proviso that the total number of m and p is 1 to 5, and a catalyst amount of a polyvalent metal compound.

2. The process as defined in claim 1, wherein ammonium chloride is used in an amount of 1.1–1.5 mol per one mol of phosphorus pentachloride.

3. The process as defined in claim 1, wherein the basic organic compound is a compound selected from the group consisting of quinoline, isoquinoline, 2methylquinoline, 3-methylquinoline, 4-methylquinoline, 5-methylquinoline, 6-methylquinoline, 7-methylquinoline, 8-methylquinoline, 2-chloroquinoline, 3-chloroquinoline, 4-chloroquinoline, 5-chloroquinoline, 6-chloroquinoline, 2,3-dichloroquinoline, 2-methyl-4-bromoquinoline, 3-chloroisoquinoline, 8-chloroisoquinoline, 2-hydroxypyridine, 3-hydroxypyridine, 4-hydroxypyridine, 2,6dihydroxypyridine, 3-hydroxy-6-methylpyridine, 2-chloropyridine, 3-chloropyridine and 2,6-dichloropyridine.

4. The process as defined in claim 1, wherein the basic organic compound is present in an amount of 1/20–1 mol per one mol of phosphorus pentachloride.

5. The process as defined in claim 1, wherein the inert organic solvent comprises at least one member selected from the group consisting of tetrachloroethane, tetrachloroethylene, monochlorobenzene, dichlorobenzene and nitrobenzene.

6. The process as defined in claim 1, wherein the inert organic solvent is tetrachloroethane or monochlorobenzene.

7. The process as defined in claim 1, wherein the inert organic solvent is used in an amount of 2-5 ml per one gram of phosphorus pentachloride.

8. The process as defined in claim 1, wherein the polyvalent metal compound is a compound of a metal selected from the group consisting of zinc, magnesium, tin, titanium, boron, aluminum, iron, cobalt, nickel, manganese, chromium, molybdenum and copper.

9. The process as defined in claim 1, wherein the polyvalent metal compound is a compound selected from the group consisting of oxides, hydroxides, carbonates and organic acid salts that can be converted into chlorides with hydrogen chloride, chlorides, sulfates and nitrates.

10. The process as defined in claim 1, wherein the polyvalent metal compound is used in an amount of more than 1/200 mol per one mol of phosphorus pentachloride.

11. The process as defined in claim 1, wherein the polyvalent metal compound is used in an amount of more than 1/100 mol per one mol of phosphorus pentachloride.

12. A process for the preparation of phosphonitrile chloride oligomer in which the yield of cyclic phosphonitrile chloride trimer is increased and the yield of cyclic phosphonitrile chloride tetramer is decreased, comprising reacting phosphorus pentachloride with ammonium chloride in an inert organic solvent, and in the presence in the reaction system of a catalytic amount of a basic organic compound selected from the group consisting of quinoline, isoquinoline and their derivatives represented by the general formulae:

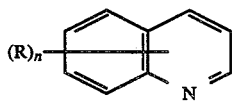

and

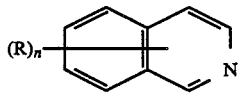

wherein R stands for an alkyl group or a halogen atom and n stands for zero or an integer of 1 to 7, and a catalytic amount of a polyvalent metal compound.

* * * * *